United States Patent [19]

Trenkler

[11] 4,243,261
[45] Jan. 6, 1981

[54] BODY FOR MOTOR VEHICLES, ESPECIALLY AUTOMOBILES, WITH A SLIDING ROOF HAVING A FRAME BOTTOM

[75] Inventor: Werner Trenkler, Asperg, Fed. Rep. of Germany

[73] Assignee: Dr. Ing. h.c.F. Porsche Aktiengesellschaft, Fed. Rep. of Germany

[21] Appl. No.: 15,650

[22] Filed: Feb. 27, 1979

[30] Foreign Application Priority Data

Mar. 4, 1978 [DE] Fed. Rep. of Germany ....... 2809379

[51] Int. Cl.³ .............................................. B60J 7/00
[52] U.S. Cl. .................................... 296/213; 296/210; 296/223
[58] Field of Search ............. 296/137 E, 137 F, 137 G

[56] References Cited

U.S. PATENT DOCUMENTS

| | | | |
|---|---|---|---|
| 3,352,600 | 11/1967 | Wilfert | 296/137 F |
| 3,580,629 | 5/1971 | Heim | 296/137 E |
| 3,806,186 | 4/1974 | Mauron | 296/137 G |

Primary Examiner—John J. Love
Assistant Examiner—John A. Carroll
Attorney, Agent, or Firm—Craig and Antonelli

[57] ABSTRACT

A body for motor vehicles, such as automobiles, with a sliding roof having a frame bottom is disclosed. The frame bottom is reinforced by at least one indentation and constitutes a rigid supporting structure at least with a portion of the transverse and longitudinal supports of a supporting structure located below the roof of the vehicle whereby the roof is prevented from being pushed in, endangering the passengers, in the event the vehicle should overturn.

10 Claims, 5 Drawing Figures

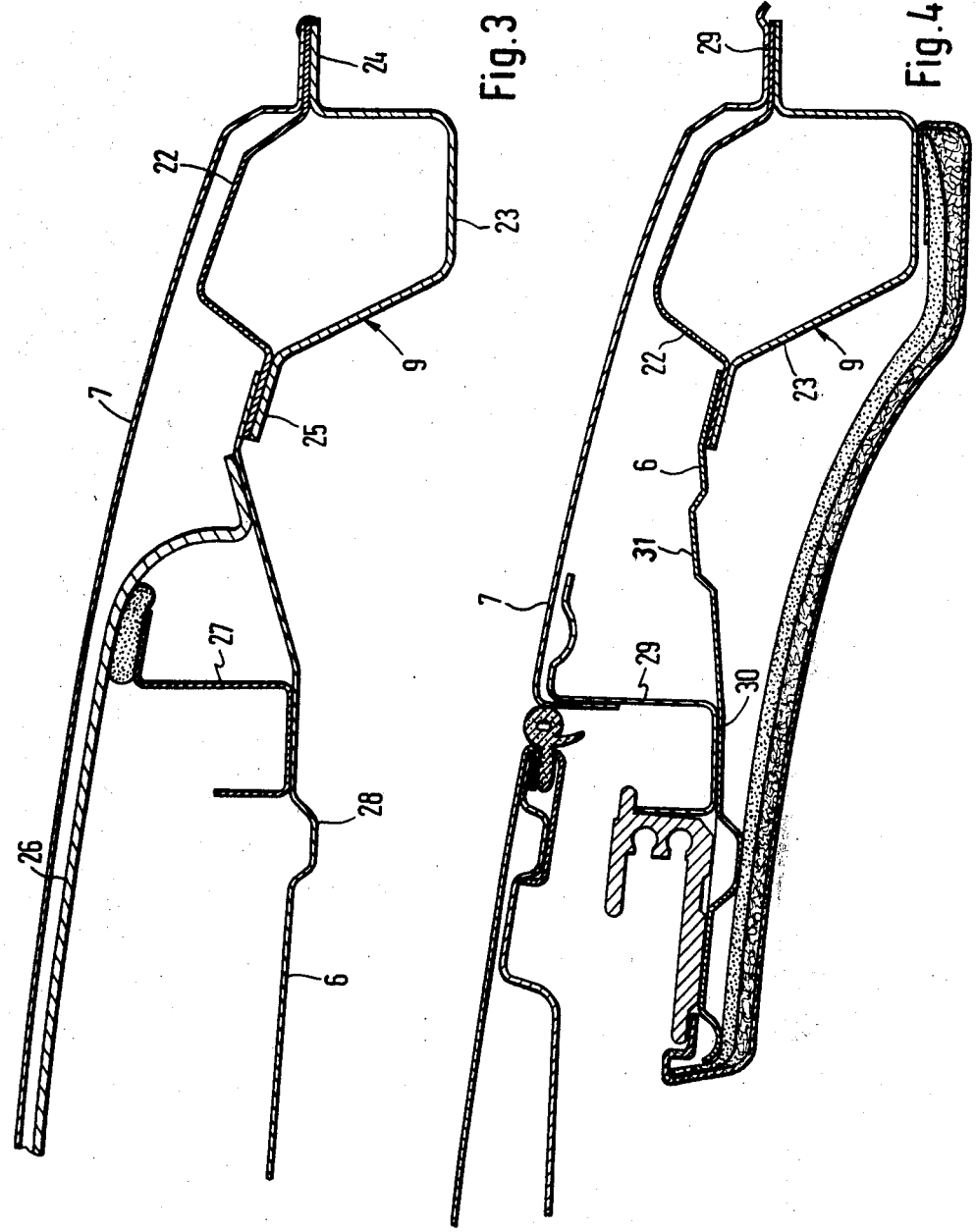

BODY FOR MOTOR VEHICLES, ESPECIALLY AUTOMOBILES, WITH A SLIDING ROOF HAVING A FRAME BOTTOM

BACKGROUND AND SUMMARY OF THE INVENTION

The present invention relates to a body for motor vehicles such as automobiles, comprising a sliding roof with a frame bottom and a supporting structure located below the roof of the motor vehicle, said supporting structure being formed by transverse and longitudinal members.

Strict safety requirements are imposed on automobile bodies today to protect the passengers effectively against injury in the event of accidents. This requires a rigid design for the passenger compartment which is accomplished by using supporting structures. It is necessary, especially for the category of accidents involving overturning of the vehicle, to provide longitudinal and transverse supports beneath the roof of such a body.

When a sliding roof is installed in such a body, it is precisely the area of the sliding roof which poses special danger of injury to the passengers if the vehicle should overturn.

In a known sliding roof design (German Ausleges-chrift No. 1 281 871), the sliding roof opening is bordered only by a U-shaped gutter, which could not withstand the stresses arising if the vehicle should overturn.

Thus, an object of the present invention is to provide the body of a motor vehicle such as an automobile in the area of the sliding roof such that it can accept high stresses, especially if the vehicle should overturn, with simple manufacture. However, the assemblies required to drive the sliding roof, such as the electric motor, transmission, etc. must be so disposed that they take up little space and do not have a disadvantageous effect upon the size and/or travel of the sliding roof for a given roof length.

The above and other objects are attained according to the present invention by providing a body for motor vehicles of the aforementioned type wherein the frame bottom is reinforced by at least one indentation, and forms a rigid supporting structure, at least with a portion of the transverse and longitudinal supports. It is advantageous in this respect for the frame bottom to be integrated in the unfinished cage of the structure.

According to one preferred embodiment of the present invention a gutter surrounding the sliding roof opening forms a part of the roof. The gutter is mounted against the frame bottom and is connected to the latter by gluing, welding, or the like. The frame bottom is connected with all of the supports of the frame structure. The rear transverse support of the supporting structure is formed by a section, open on one side, whereby this side is closed by a segment of the frame bottom. This rear transverse support has a dome-shaped profile in cross section with flanges which are connected by gluing, welding, or the like with the segment of the support structure. The sliding roof is actuated by means of an electric motor provided with a transmission, the electric motor and the transmission being supported by the rear transverse support and the frame bottom. In addition, the electric motor and transmission are disposed at least partially countersunk in the frame bottom and/or transverse support.

Advantages are achieved according to the present invention in that the reinforced frame bottom and the transverse and longitudinal supports of the frame structure form a rigid supporting structure integrated in the unfinished cage of the motor vehicle, said supporting structure preventing the roof from being pushed in, endangering the passengers, if the vehicle should overturn. The frame bottom is connected with the transverse and longitudinal supports of the unfinished cage, so that no particular assembly procedures are required. The arrangement of the electric motor and transmission not only permits effective utilization of the size and/or travel of the sliding roof for a given roof, but also allows these parts to be especially easily mounted on the rear transverse support, if the latter is appropriately designed.

BRIEF DESCRIPTION OF THE DRAWINGS

These and other objects, features and advantages of the present invention will become more apparent from the following description when taken in connection with the accompanying drawings which show, for purposes of illustration only one embodiment in accordance with the present invention, and wherein:

FIG. 3 is a cross section taken along line III—III of FIG. 1 on an enlarged scale;

FIG. 4 is a cross section taken along line IV—IV in FIG. 1 on an enlarged scale.

DETAILED DESCRIPTION OF THE DRAWINGS

Figure 1:
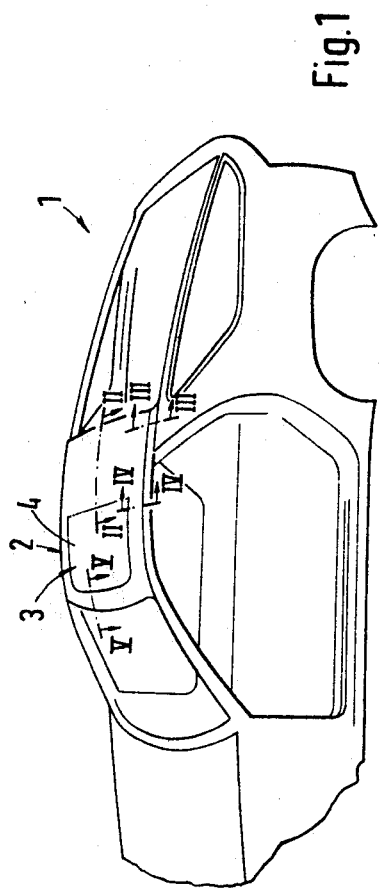
FIG. 1 is an elevated side view of a body for an automobile with a sliding roof.

Motor vehicle 1, designed as an automobile, has a body 2 made of steel or aluminum sheet or the like, provided with a sliding roof 3.

Sliding roof 3 comprises a movable cover 4, inserted in an opening 5 in body 2, and movable from a position which closes this opening to an open position. Moreover, sliding roof 3 is provided with a frame bottom 6 extending below roof 7 of the vehicle 1.

Likewise, a supporting frame structure is disposed beneath roof 7, said supporting structure being formed by a rear transverse support 8, two longitudinal supports 9 running laterally along the roof, and a forward transverse support 10. These supports form part of the unfinished cage of the vehicle body.

Moreover, frame bottom 6 is connected with these supports in such manner that a rigid supporting structure results, the frame bottom thus being integrated in the unfinished cage of the vehicle body.

Figure 2:
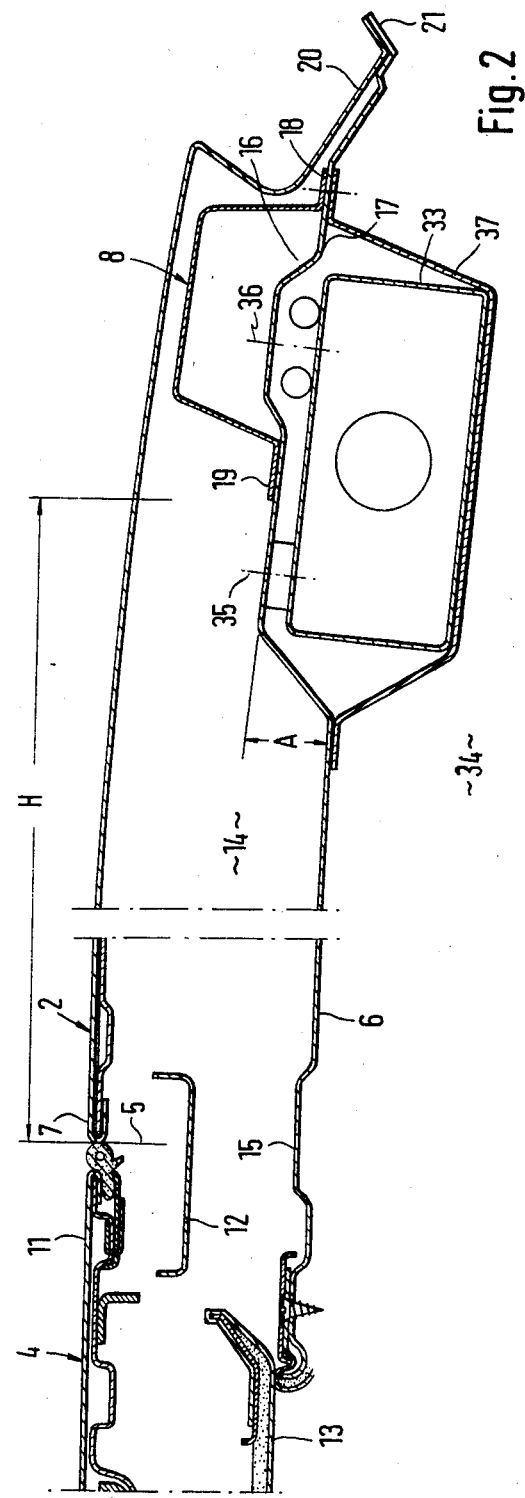
FIG. 2 is a cross section taken along line II—II of FIG. 1 on an enlarged scale.

FIG. 2 shows cover 4 in its closed position. It is formed by an outer part 11, a rain gutter 12, and a headlining 13. When cover 4 is opened these parts move into a niche 14 formed by frame bottom 6 and roof 7, whereby the total travel of the cover is represented by H. Frame bottom 6 is reinforced by crimped indentation 15, in such manner that it possesses girder-like properties.

The rear transverse support 8 is formed by a section which is open on one side 16. This section is closed by a segment 17 of frame bottom 6. In the embodiment, the rear transverse support is made in the form of a dome-shaped section. Flanges 18, 19 of the dome-shaped section are connected by gluing, welding, or the like with segment 17, whereby segment 17 is moved in the direction of roof 7 (dimension A) with respect to the other frame bottom 6.

Frame bottom 6 and roof 7 are brought together behind transverse support 8, form a gutter 20, and are connected tightly together at 21. Thus, frame bottom 6 is integrated in the unfinished cage.

According to FIG. 3, longitudinal support 9 comprises an upper part 22 and a lower part 23, assembled at spot-welded flanges 24, 25. Roof 7 is connected with flange 24, while on the other hand frame bottom 6 abuts flange 25 and is connected to the latter. Frame bottom 6, moreover, is provided with a reinforcement 26, running transversely to the longitudinal axis of the vehicle, and a gutter 27. Reinforcement 26 and gutter 27 are fastened by appropriate means to frame bottom 6. The frame bottom also has an indentation 28 in this area.

Gutter 27 constitutes part of frame bottom 6 in FIG. 3. According to FIG. 4, it is designated 29 and is a part of the roof 7, i.e., during assembly, the roof 7 together with gutter 29 is lowered from above on to the unfinished cage and connected at 30 with the latter. Thus, gutter 29 forms an efficient extension of gutter 27. The two gutters 27 and 29 overlap one another at a connection point which is not shown. Frame bottom 6 is reinforced in this area with an indentation 31.

Figure 5:
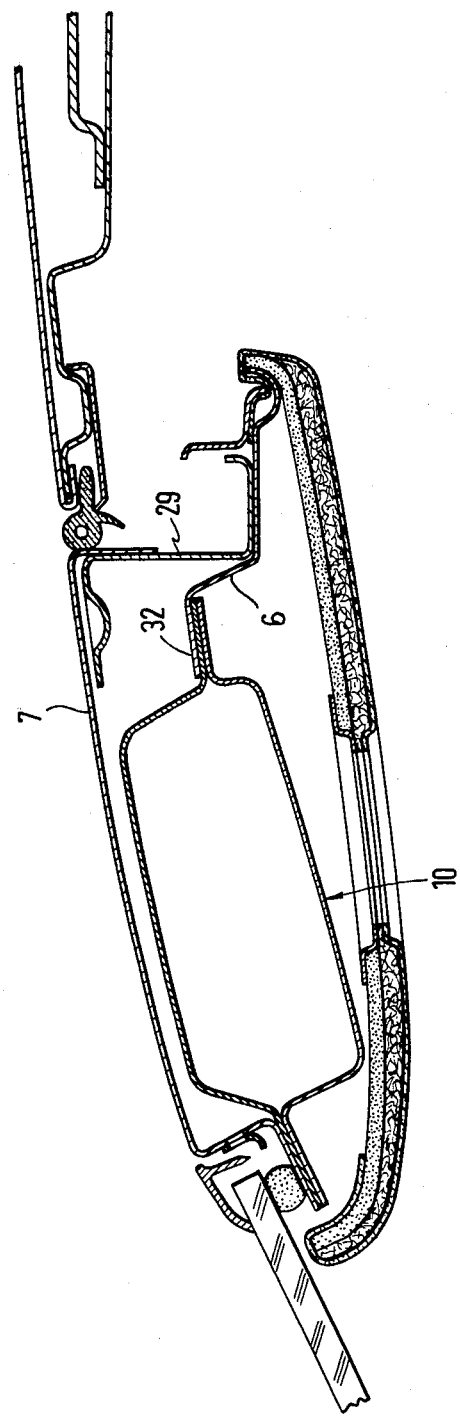
FIG. 5 is a cross section taken along line V—V in FIG. 1 on an enlarged scale.

The forward transverse support 10, which corresponds structurally to longitudinal support 9, is connected at 32 with frame bottom 6 as shown in FIG. 5. The course of assembly and the arrangement of frame bottom 6 and gutter 29 in terms of structural assemblies corresponds to the arrangement already described above.

In the illustrated embodiment of the present invention, frame bottom 6 is connected circumferentially with the supporting structure, that is, supports 8, 9, and 10. However, it is also possible to form the connection only between a transverse support, e.g. the rear transverse support 8, and the lateral supports 9. It is also possible to make the frame bottom 6 integral with the supports, e.g. with the upper part 22 of support 9.

As depicted in FIG. 2, cover 4 of sliding roof 3 is actuated by an electric motor 33 which is provided with a transmission. This motor is disposed below transverse support 8 and/or frame bottom 6, in order to achieve the largest possible travel for the cover for a given roof length, and is at least partially countersunk, so that no significant part of the motor projects into passenger compartment 34.

Known means, provided at 35 and 36, are provided to mount the motor. If desired, noise-reducing elements can be provided between the motor and the body. The area of the motor is covered by a covering 37, which can be made of plastic for example.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

I claim:

1. A body for motor vehicles such as automobiles comprising a sliding roof provided with a frame bottom and a supporting structure located below the roof of the vehicle, said supporting structure including transverse and longitudinal supports, wherein said frame bottom is reinforced by at least one indentation and is connected with at least a portion of the transverse and longitudinal supports so as to constitute a rigid supporting structure, and wherein gutter means are provided which delimit an opening provided in the roof of the vehicle for the sliding roof, said gutter means connecting said frame bottom and roof of the vehicle together.

2. A body according to claim 1, characterized in that said transverse and longitudinal supports form part of the unfinished cage of the vehicle body, and said frame bottom thus being integrated in the unfinished cage of said vehicle body.

3. A body according to claim 1, characterized in that said gutter means completely which surround the opening provided in the roof of the vehicle for the sliding roof.

4. A body according to claim 3, characterized in that at least a portion of said gutter means is connected with the frame bottom by gluing, welding, or the like.

5. A body according to claim 1, characterized in that the frame bottom is connected to all of the longitudinal and transverse supports of the supporting structure.

6. A body according to claim 1, characterized in that a rear transverse support of the supporting structure is formed by a section open on one side, the open side of said section being closed by a segment of the frame bottom.

7. A body according to claim 6, characterized in that said rear transverse support has a dome-shaped profile with flanges in cross section, the flanges of said profile being connected to said segment of the frame bottom by gluing, welding, or the like.

8. A body according to claim 1, 6 or 7, wherein the sliding roof is actuated by electric motor means provided with a transmission, said electric motor means with transmission being supported by a rear transverse support of said supporting structure and by the frame bottom.

9. A body according to claim 8, characterized in that said electric motor means with transmission is mounted at least partially countersunk on the frame bottom and/or transverse support.

10. A body according to claim 1, characterized in that said frame bottom is reinforced by a plurality of indentations.

* * * * *